US006863815B1

(12) United States Patent
Smith

(10) Patent No.: US 6,863,815 B1
(45) Date of Patent: Mar. 8, 2005

(54) SMALL-SCALE HYDROGEN-OXIDIZING-DENITRIFYING BIOREACTOR

(75) Inventor: Richard L. Smith, Boulder, CO (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/662,507

(22) Filed: Sep. 14, 2000

(51) Int. Cl.[7] .................................................. C02F 3/00
(52) U.S. Cl. ...................... 210/601; 210/748; 210/170; 210/603; 210/615; 210/631
(58) Field of Search ................................ 210/601, 748, 210/170, 603, 615–617, 631, 611

(56) References Cited

U.S. PATENT DOCUMENTS

| | | | |
|---|---|---|---|
| 3,709,364 A | | 1/1973 | Savage |
| 3,829,377 A | | 8/1974 | Hashimoato |
| 3,846,289 A | | 11/1974 | Jeris et al. |
| 3,943,038 A | * | 3/1976 | Morinaga |
| 4,043,936 A | | 8/1977 | Francis et al. |
| 4,124,481 A | | 11/1978 | Ramer |
| 4,337,142 A | * | 6/1982 | Knudson et al. ............ 208/433 |
| 4,469,599 A | | 9/1984 | Gros et al. |
| 4,505,819 A | | 3/1985 | Barnes et al. |
| 4,696,747 A | | 9/1987 | Verstraete et al. |
| 4,957,514 A | * | 9/1990 | Golden et al. .................. 95/98 |
| 5,087,354 A | * | 2/1992 | Montagnon et al. ........ 210/108 |
| 5,192,441 A | | 3/1993 | Sibony et al. |
| 5,206,168 A | | 4/1993 | Boyle |
| 5,352,608 A | * | 10/1994 | Kaplan et al. ............... 435/262 |
| 5,362,636 A | * | 11/1994 | Yokomori |
| 5,811,255 A | * | 9/1998 | Hunter |
| 6,077,429 A | * | 6/2000 | Frankenberger et al. .... 210/605 |
| 6,214,607 B1 | * | 4/2001 | Logan ..................... 435/262.5 |
| 6,238,564 B1 | * | 5/2001 | Tanaka |
| 6,387,262 B1 | * | 5/2002 | Rittmann et al. ....... 210/321.89 |
| 6,423,533 B1 | * | 7/2002 | Gearheart et al. ........ 435/262.5 |

FOREIGN PATENT DOCUMENTS

| | | | | | |
|---|---|---|---|---|---|
| JP | | 59177385 A | * | 10/1984 | ............. C25B/9/00 |
| JP | | 404094799 A | * | 3/1992 | |

OTHER PUBLICATIONS

Grant & Hackh's Chemical Dictionary, 5th ed., McGraw–Hill Book Co., definition of "hydrolysis," at p. 293.*

Egli, C., Tschan, T., Scholtz, R., Cook, A. M., & Leisinger, T. Transformation of tetrachloromethane to dichlormethane and carbon dioxide by Acetobacterium woodii, Applied and Environmental Microbiology, 54, 2819–2824, 1988.*

* cited by examiner

Primary Examiner—Chester T. Barry
(74) Attorney, Agent, or Firm—Anne M. Kornbau

(57) ABSTRACT

A method for treating nitrate-contaminated water comprising treating said water with hydrogen-oxidizing denitrifying bacteria in the presence of hydrogen. The apparatus for use in this method preferably comprises:

(a) a pure culture of autotrophic, hydrogen-oxidizing denitrifying bacteria;
(b) a hydrogen generator;
(c) a flow-through bioreactor; and
(d) a filtration unit.

11 Claims, 3 Drawing Sheets

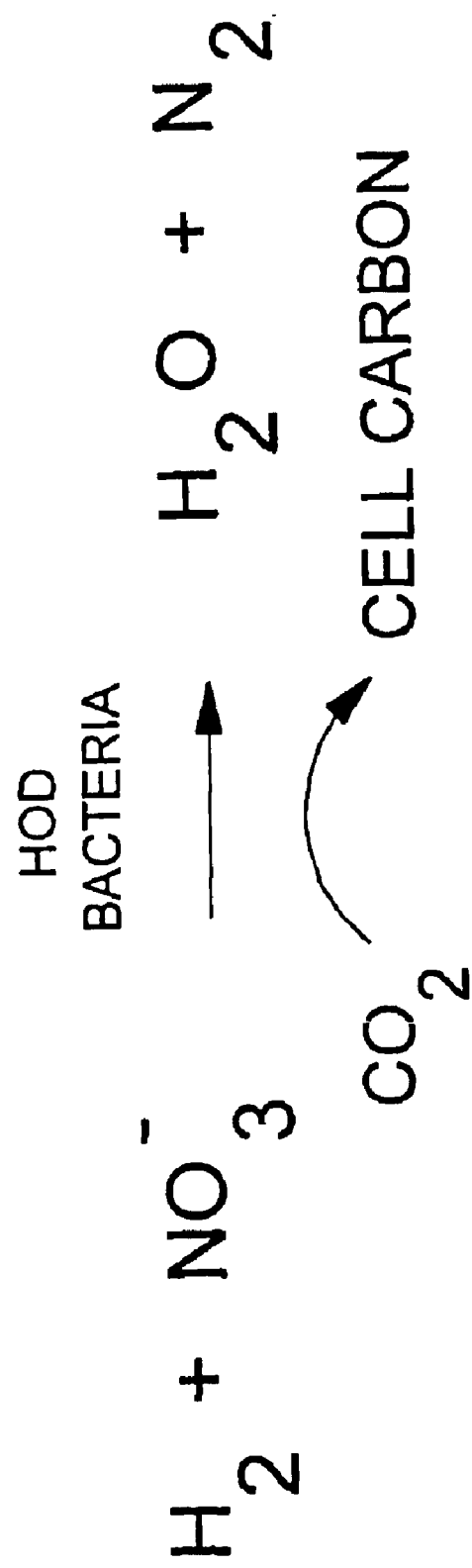
FIGURE 1. HYDROGEN COUPLED DENITRIFICATION

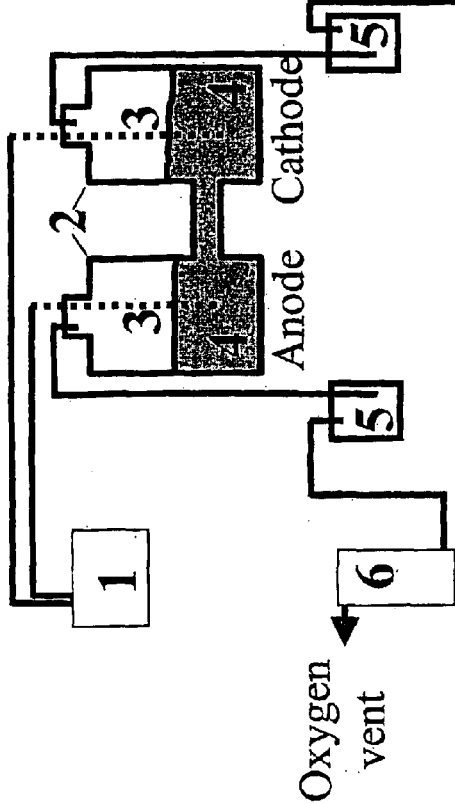

Fig 2. Hydrogen Generator

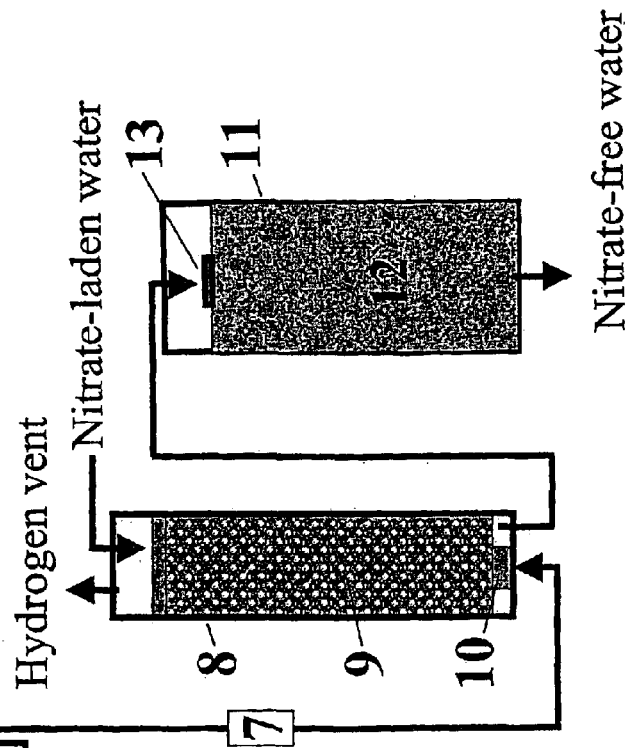

Fig 3. Denitrifying Bioreactor and Sand Filter

Numbered Items 1. 12 volt, 2 amp, DC power supply
2. Glass containers, with pressure tight screw top lids, connected via side arm tubing
3. Platinum wire electrodes
4. 4 N Sodium hydroxide
5. Sodium hydroxide trap
6. Adjustable flow meter
7. Check valve
8. Flow-through plastic pipe, with endcaps
9. Sorted pea-gravel, 2-4 mm
10. Airstone
11. Plastic pipe with endcap on bottom
12. Washed sand
13. Water distribution block

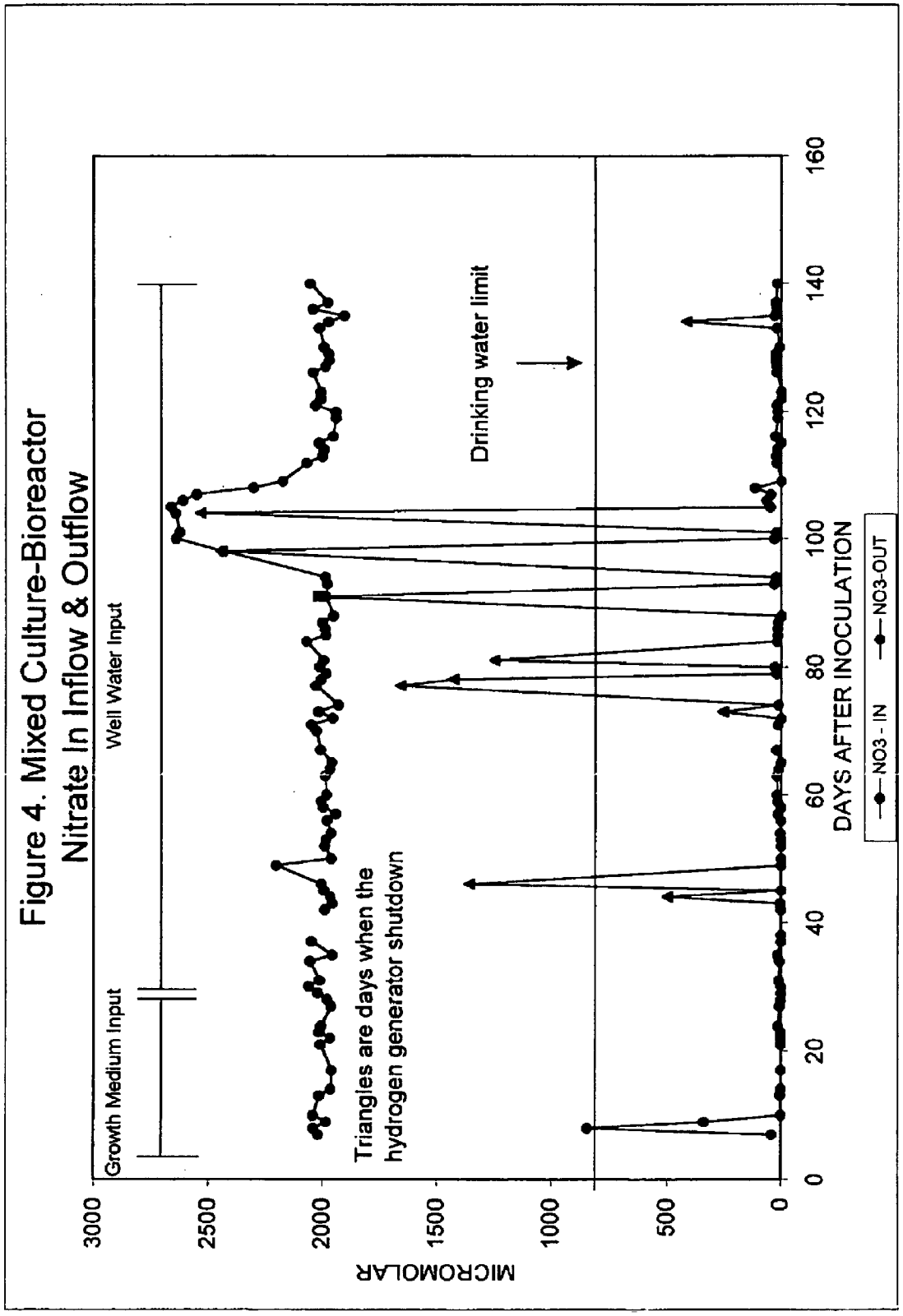

SMALL-SCALE HYDROGEN-OXIDIZING-DENITRIFYING BIOREACTOR

FIELD OF THE INVENTION

The present invention relates to a method and apparatus for hydrogenating and denitrifying nitrate-contaminated water or waste materials.

BACKGROUND OF THE INVENTION

Nitrate is the most prevalent ground-water contaminant worldwide. Nitrate originates from agricultural, sewage-disposal, and industrial practices from both point and non-point sources. Through not exclusive to the subsurface, nitrate contamination is much more pervasive in ground water because nitrate has a relatively long residence time in that environment. Ground water is also the most common drinking water source for both humans and livestock in rural and suburban areas of the United States. Thus, when the nitrate concentration in water from a supply well exceeds drinking water standards (i.e., 10 mg/L nitrogen), the burden typically falls upon the individual user or household to deal with the problem.

The options currently available to treat nitrate contamination on a small scale level are limited. Since nitrate is stable in aqueous solution, it can only be safely removed chemically by techniques such as anion exchange. This can be costly, replaces one salt for another, and at times is ineffective, depending upon the composition of other salts in the water. Moreover, there is the need to dispose of the nitrate that has been removed. Additional, cost-effective technology to remove nitrate from drinking water is needed: technology that is effective, safe, and practical at the household and livestock supply scales.

Processes for eliminating nitrates from water by denitrification in microbiological reactors are known. These processes, such as those conducted in rising current reactors containing a granular denitrifying biomass, have been described, for example, by Lettings et al., (1980) and by Timmermans, (1983).

For waste waters in particular, different reducing agents such as sugars, less expensive biodegradable organic material, including cellulose and ethanol, have been used. However, only ethanol has been used in treating water that is to be potable. These conventional reducing agents have the disadvantage that they dissolve in water and reduce the quality of the potable water produced. Therefore, it requires another step to eliminate these reducing agents before the water is ready for use.

Verstrate et al., in U.S. Pat. No. 4,696,747, describe a process for eliminating nitrates by biological conversion in the presence of hydrogen gas. This process uses alcaligenous eutrophic bacteria, with *Pseudomonas denitrificans* and *Micrococcus denitrificans* being the preferred microorganisms. However, these bacteria cannot grow and remain active in a hydrogen-fed bioreactor when nitrate is not present, particularly when oxygen is removed.

Hydrogen-oxidizing bacteria, some of which are capable of denitrifying nitrogen oxides, are well known and have been studied in detail for many years (Aragno & Schlegel, 1981). Pilot-scale industrial plants that use mixed-culture populations of hydrogen-oxidizing denitrifiers have been operated in Belgium (Liessens et al., 1992) and Germany (Gros et al., 1988) to produce drinking water from nitrate-contaminated ground water. These plants are engineered to produce up to 50 $m^3$ per day. They are technically complex, require a commercial supply of hydrogen, and trained experts to ensure an adequate function on a daily basis. As a result, an analogous approach or device has not been developed to treat nitrate on a small-scale basis.

SUMMARY OF THE INVENTION

It is an object of the present invention to overcome the aforesaid deficiencies of the prior art.

Is is another object of the present invention to provide a bioreactor for treating nitrate-contaminated drinking water.

It is a further object of the present invention to provide a small scale bioreactor for treating nitrate-contaminated drinking water.

It is another object of the present invention to provide a method for treating nitrate-contaminated drinking water even when oxygen is not present in the water being treated.

According to the present invention, autohydrogenotrophic-denitrifying (HOD) bacteria, also known as hydrogen-oxidizing denitrifying bacteria, are used to treat nitrate contamination in water. These bacteria can grow and remain active in a hydrogen-fed bioreactor even when nitrate is not present and even after oxygen has been removed. Of course, there is no reason to attempt to remove nitrate where none is present. However, the function of the bioreactor is much more robust if the bacteria used within it do not need nitrate. For example, the supply of water that is being treated may be shut off for period of time, thus removing the nitrate supply, without affecting the viability of the bacteria within the bioreactor as long as the hydrogen supply is not disrupted. Additionally, some small scale operations may only be used to treat water intermittently. Moreover, these bacteria are more efficient in the exit end of the bioreactor because they do not require a minimal concentration of nitrate to function. Thus, an adequate amount of biomass will be present in the nitrate-free zone of the bioreactor, which helps to insure that the nitrate really is completely removed. This also makes the bioreactor more adaptable to variations in changes in output flow or input nitrate concentration without nitrate breakthrough in the output.

Nitrate-contaminated drinking water is treated with autotrophic, hydrogen-oxidizing denitrifying bacteria which can be isolated from subsurface environments. A low cost water electrolysis unit that provides a continuous supply of oxygen-free hydrogen is used to generate hydrogen for the process. The bacteria are contained in a flow-through bioreactor which maximizes the ability of the bacteria to remove nitrate in the presence of hydrogen. A sand filtration unit removes unwanted microbial biomass from the treated water.

The present invention provides a small scale nitrate-removal system that uses hydrogen-oxidizing denitrifying bacteria to remove nitrate from the water supplies being used by individual households, farms, or small businesses, the users that are most frequently affected by nitrate contamination and the least likely to find affordable alternative water sources. Flow-through bioreactor systems, e.g., septic tanks, are frequently used on this scale to treat wastewater. The operating parameters for these types of septic systems are also suitable goals for designing a drinking water treatment system. The system of the present invention is cost effective, robust, requires minimal expertise and attention to operate, and produces sufficient quantities of potable water for small scale usage.

The device according to the present invention consists of four principle components:

(1) autotrophic, hydrogen-oxidizing denitrifying (HOD) bacteria isolated from subsurface environments;

(2) a low-cost water electrolysis unit that provides a continual supply of oxygen-free hydrogen;

(3) a flow-through bioreactor that contains the hydrogen-oxidizing-denitrifying bacteria and is designed to maximize their ability to remove nitrate in the presence of hydrogen; and (4) a sand filtration unit to remove unwanted microbial biomass from the treated water.

BRIEF DESCRIPTION OF THE DRAWINGS

FIG. 1 shows the reaction for hydrogen-coupled denitrification using HOD bacteria.

FIG. 2 shows a hydrogen generator for use in the present invention.

FIG. 3 shows a denitrifying bioreactor and sand filter according to the present invention.

FIG. 4 shows nitrate concentrations in the inflow and outflow of a mixed culture bioreactor.

DETAILED DESCRIPTION OF THE INVENTION

Most current understanding of denitrification as a process, and the denitrifying bacteria themselves, comes from studies relating to nitrogen removal mechanisms in soils and sewage treatment applications. Only recently has the process been studied in more nutrient-poor habitats, such as ground water. These studies have revealed that denitrification can occur in the subsurface under suitable conditions (Smith & Duff, 1988; Spaulding & Parrot, 1994), and that the physical, chemical, and biological factors that control the process in an aquifer are different from surface soils, sediments, and treated sewage (Brooks et al., 1992; Smith et al., 1992; Smith et al., 1996). The present inventor has also discovered that certain subgroups of denitrifying bacteria, whose ecological role previously had been only poorly studied, can be prominent in ground water. One such group is the hydrogen-oxidizing denitrifiers (Smith et al., 1994).

In the process of isolating and characterizing hydrogen-oxidizing denitrifying bacteria, the present inventor discovered that they are comparatively robust microorganisms that can be used as agents to remediate nitrate-contaminated drinking water on a small scale. The present invention provides a low cost, simple hydrogen delivery system that can be used in conjunction with these microorganisms as a pump and treat approach for nitrate-contaminated waters.

Denitrification is a process mediated by a specialized group of microorganisms. These microbes use nitrate as a respiratory terminal electron acceptor in lieu of oxygen, dissimilating the nitrate to nitrogen gas. Because denitrification is a respiratory process, it can consume relatively large amounts of nitrate, and it produces an innocuous end product. Heterotrophic denitrification has been recognized by the sewage treatment industry for some time as a process that can be manipulated to remove nitrate from treated sewage by adding methanol or some other carbon supply to stimulate denitrifying bacteria. The main limitations of heterotrophic denitrification, including cost, expertise required, and unwanted by-products which reduce water quality, generally preclude the use of this approach on a small scale basis for treating potable water.

Hydrogen-oxidizing denitrifying (HOD) bacteria obtain their energy by oxidizing hydrogen gas and coupling that to nitrate reduction, as shown in FIG. 1. These bacteria occupy a unique ecological niche, one in which there is little competition from other microorganisms. The end products of the HOD process are water and nitrogen gas, which are harmless and inconsequential from the perspective of a drinking water supply, as is the small amount of hydrogen that can dissolve in water. In addition, many of the HOD bacteria in groundwater are autotrophic (Smith et al., 1994). That means that they use carbon dioxide as a carbon source for growth; they have no additional carbon requirements. Because carbon dioxide is present in natural waters as carbonate, these bacteria can be used to remove nitrate in a water supply simply by adding hydrogen gas. This treatment is very selective for HOD bacteria, excluding all other types of microorganisms that could not grow under such conditions. The HOD bacteria can also use hydrogen and respire aerobically. This trait is very useful in a nitrate removal bioreactor because oxygen inhibits denitrification. Thus, oxygen must first be removed from any water supply before denitrification can commence within the reactor. However, the same HOD culture can effect both oxygen and nitrate removal, as long as an adequate supply of hydrogen is available.

Hydrogen gas has a low solubility in water. This low solubility requires that an excess of hydrogen be always available to remove the quantities of nitrate found in many contaminated water supplies. Hydrogen that is not utilized by HOD bacteria in the treatment process can be easily removed from the water by aeration. Hydrogen can be generated via electrolysis of water, which produces hydrogen gas at the anode and oxygen gas at the cathode at a molar stoichiometry of 2:1. The amount of hydrogen produced is dependent upon the voltage applied to the electrodes and the electrolyte concentration.

Flow-through bioreactors are designed to provide a fixed stationary support for an attached microbial biofilm. The biofilm contacts or is immersed in a flowing aqueous stream and removes or alters the chemical composition of the water via the activity of the attached microorganisms. In some cases, nutrients or substrates for the microorganisms need to be added to the bioreactor. If the substrate is a gas, such as hydrogen, countercurrent flow of the gas and the water is advantageous to increase the availability of the gas to the microorganisms. This can also serve as a mechanism to strip other unwanted gases, such as oxygen, out of solution.

One embodiment of the present invention is shown in FIGS. 2 and 3, and consists of the following four components, the numbers within the text referring to the numbered items in the figures:

Component 1. HOD Bacteria

Pure cultures of autotrophic, hydrogen-oxidizing, denitrifying (HOD) bacteria are used as the reactive agents in the flow-through bioreactor used in this invention. The bacteria have been isolated from nitrate-containing groundwater environments. This makes them ideal for such a treatment system because an aquifer is characterized by water flowing through a porous medium, which is identical to the function of the bioreactor. These microorganisms require no organic carbon for growth, only hydrogen, nitrate, and carbon dioxide.

Autohydrogenotrophic (HOD) bacteria are those which obtain energy from the oxidation of molecular hydrogen coupled with the reduction of nitrate to a gaseous form of nitrogen using inorganic carbon as the sole carbon source for cell growth. HOD bacteria are not limited to one single class of microorganism. However, HOD bacteria can be identified by growing the isolate on HOD medium in the presence of hydrogen. Development of turbidity accompanied by loss of nitrate is considered to be a positive result of HOD capacity. This procedure is described in detail in Smith et al., (1994), the entire contents of which are hereby incorporated by reference.

As described in Smith et al., ibid., a number of HOD bacteria were tested and their characteristics identified. Tables 1 and 2 show characteristics of some of these bacteria and kinetic parameters of hydrogen uptake by some of the cultures of HOD bacteria.

TABLE 1

Characteristics of hydrogen-oxidizing denitrifying bacteria isolated from nitrate-contaminated groundwater

| Strain | Motility | Catalase[a] | Oxidase[a] | Aerobic growth[b] on: | | | | | | | | | | | | |
|---|---|---|---|---|---|---|---|---|---|---|---|---|---|---|---|---|
| | | | | Gu | Xy | Me | Su | Fr | Fo | Ci | Ac | Py | Lc | Sc | Gm | Le |
| HOD 1 | + | + | w | − | − | − | − | − | − | − | + | + | + | − | + | − |
| HOD 2 | + | + | + | − | − | − | − | − | − | − | + | + | + | + | + | − |
| HOD 3 | + | w | w | − | − | − | − | − | − | − | + | + | + | − | + | − |
| HOD 4 | + | + | + | − | − | − | − | − | − | − | + | + | + | + | + | − |
| HOD 5 | + | + | w | − | − | − | − | − | − | − | + | + | + | + | + | − |
| HOD 6 | + | + | w | − | − | − | − | − | − | − | + | + | + | + | + | − |
| HOD 7 | − | − | + | + | + | − | + | + | + | + | + | + | + | + | + | + |
| HOD 8 | + | + | + | − | − | − | − | − | − | − | + | + | + | + | + | − |
| HOD 9 | + | + | w | − | − | − | − | − | − | − | + | + | + | + | + | − |
| P. denitrificans ATCC 17741 | − | + | + | + | + | + | + | + | + | − | + | + | + | + | + | + |

[a]w, weakly positive.
[b]Substrates tested for growth: Gu, glucose; Xy, xylose; Me, methanol; Su, sucrose; Fr, fructose; Fo, Formate; Ci, citrate; Ac, acetate; Py, pyruvate; Lc, lactate; Sc, succinate; Gm, glutamate; and Le, leucine.

TABLE 2

Kinetic parameters for hydrogen uptake by cultures of hydrogen-oxidizing denitrifying bacteria with nitrate as the electron acceptor

| Strain[a] | $K_m$ ($\mu$M) | $V_{max}$ (fmol cell$^{-1}$ h$^{-1}$) |
|---|---|---|
| HOD1 | 0.88 | 6.14 |
| HOD2 | 0.70 | 2.42 |
| HOD3 | 0.54 | 2.49 |
| HOD4 | 1.50 | 5.24 |
| HOD5 | 0.30 | 3.53 |
| HOD6 | 0.65 | 3.57 |
| HOD7 | 3.32 | 13.29 |
| HOD8[b] | 0.38 | 2.13 |
| | 0.79 | 1.85 |
| | 0.71 | 5.56 |
| HOD9[b] | 0.38 | 2.09 |
| | 0.60 | 1.94 |
| P. denitrificans ATCC 17741 | 0.77 | 1.33 |

[a]Cell growth and uptake assays were done in an autotrophic medium except for HOD 7, for which the medium was supplemented with 3% nutrient broth.
[b]Results from replicate experiments are shown for HOD8 and 9.

In one embodiment of the present invention, Strain HOD5 as described in Tables 1 and 2 was used. This bacterium is a gram negative, motile rod that grows on hydrogen using either oxygen or nitrate as an electron acceptor. It can also grow aerobically on nutrient broth, acetate, pyruvate, lactate, succinate, and glutamate (Table 1). Phylogenetic analysis of the full sequence of the 16S RNA reveals that HOD 5 belongs to the beta subclass of the Proteobacteria, and is most closely related to purple, non-sulfur phototrophic bacteria, particularly Rhodocyclus species.

For the bioreactor, a pure culture of HOD 5 is grown in batch culture on hydrogen and nitrate using HOD medium (Smith et al., ibid). Following development of turbidity, the culture is transferred to the bioreactor column which has been filled with HOD medium. The culture is grown statically in the bioreactor, with hydrogen flowing, for 2–3 days before the water supply is turned on.

The HOD isolates shown in Table 1 and several other HOD strains isolated from groundwater (Wahlquist, 2000), have been characterized molecularly, the sequence match results are summarized in Table 3. The results shown in the this table are restricted to the top three matches for each isolate, excluding any database strains with sequences less than 1000 base pairs and those that are not aligned to the RDP tree.

TABLE 3

Summary of Sequence Match results[a]

| Isolate | $S_{ab}$[b] | Full name[a] | Subdivision[d] | Group[a] | Group[a] | Subgroup[a] | Subgroup[a] |
|---|---|---|---|---|---|---|---|
| #12 | 0.870 | Rhodocyclus tenuis str. 2761 DSM 109 (T). | beta | Azoarcus | N/A[f] | Rcy. tenuis | N/A |
| | 0.867 | Rhodocyclus tenuis str. SW18. | beta | Azoarcus | N/A | Rcy. tenuis | N/A |
| | 0.860 | Rhodocyclus tenuis str. 3760 DSM 110. | beta | Azoarcus | N/A | Rcy. tenuis | N/A |
| #27 | 0.934 | Paracoccus denitrificans LMG 4218 (T). | alpha | Rhodobacter-Rhodovulum-Hyphomonas-Rickettsia | Rhodobacter | Parococcus | Par. denitrificans |
| | 0.895 | Paracoccus denitrificans DSM 65. | alpha | Rhodobacter-Rhodovulum-Hyphomonas-Rickettsia | Rhodobacter | Parococcus | Par. denitrificans |
| | 0.895 | Paracoccus pantotrophus ATCC 35512 (T). | alpha | Rhodobacter-Rhodovulum-Hyphomonas-Rickettsia | Rhodobacter | Parococcus | Par. denitrificans |
| #31 | 0.997 | Paracoccus denitrificans DSM 65. | alpha | Rhodobacter-Rhodovulum-Hyphomonas-Rickettsia | Rhodobacter | Parococcus | Par. denitrificans |
| | 0.997 | Paracoccus denitrificans ATCC 35512 (T). | alpha | Rhodobacter-Rhodovulum-Hyphomonas-Rickettsia | Rhodobacter | Parococcus | Par. denitrificans |

TABLE 3-continued

Summary of Sequence Match results[a]

| Isolate | $S_{ab}$[b] | Full name[a] | Subdivision[d] | Group[a] | Group[a] | Subgroup[a] | Subgroup[a] |
|---|---|---|---|---|---|---|---|
| | 0.993 | *Paracoccus denitrificans* LMG 4218 (T). | alpha | Rhodobacter-Rhodovulum Hyphomonas-Rickettsia | Rhodobacter | Parococcus | *Par. denitrificans* |
| #65 | 0.986 | *Paracoccus denitrificans* DSM 65. | alpha | Rhodobacter-Rhodovulum Hyphomonas-Rickettsia | Rhodobacter | Parococcus | *Par. denitrificans* |
| | 0.986 | *Paracoccus pantotrophus* ATCC 35512 (T). | alpha | Rhodobacter-Rhodovulum Hyphomonas-Rickettsia | Rhodobacter | Parococcus | *Par. denitrificans* |
| | 0.978 | *Paracoccus denitrificans* LMG 4218 (T). | alpha | Rhodobacter-Rhodovulum Hyphomonas-Rickettsia | Rhodobacter | Parococcus | *Par. denitrificans* |
| #202 | 0.825 | *Achromobacter xylosoxidans* subsp. *denitrificans* ATCC 15173 (T). | beta | Bordatella | N/A | *Brd. bronchiseptica* | N/A |
| | 0.738 | *Bordetella bronchiseptica* str. S-1. | beta | Bordatella | N/A | *Brd. bronchiseptica* | N/A |
| | 0.711 | *Bordetella holmesii* CDC F5101 (T). | beta | Bordatella | N/A | *Brd. bronchiseptica* | N/A |
| #102 | 0.909 | *Ochrobactrum anthropi* IAM 14119. | alpha | Rhizobium-Agrobacterium | N/A | Brucella Assemblage | N/A |
| | 0.884 | *Solamonas fluorantheni*. | alpha | Rhizobium-Agrobacterium | N/A | Brucella Assemblage | N/A |
| | 0.884 | *Ochrobactrum anthropi* 1FO 13694. | alpha | Rhizobium-Agrobacterium | N/A | Brucella Assemblage | N/A |
| #155 | 0.738 | *Ralstonia eutropha* str. 335 (R.Y. Stanier) ATCC 17697 (T). | beta | *Ral. eutropha* | N/A | N/A | N/A |
| | 0.680 | *Alcaligenes* sp. str. M91-3. | beta | *Ral. eutropha* | N/A | N/A | N/A |
| | 0.660 | *Ralstonia solanacearum* ATCC 11696 (T). | beta | *Ral. solanacearum* | N/A | *Ral. solana* | N/A |
| #204 | 0.731 | *Acidovorax avenae* subsp. *citrulli* ATCC 29625 (T). | beta | Acidovorax | N/A | Acidovorax | *Av. avenae* |
| | 0.726 | *Acidovorax avenae* subsp. *avenae* ATCC 19860 (T). | beta | Acidovorax | N/A | Acidovorax | *Av. avenae* |
| | 0.726 | *Aquaspirillum psychrophilum* str. CA 1 LMG 5408 (T). | beta | Acidovorax | N/A | Acidovorax | *Aqsp. psychrophilum* |
| #205 | 0.749 | *Aquaspirillum psychrophilum* str. CA 1 LMG 5408 (T). | beta | Acidovorax | N/A | Acidovorax | *Aqsp. psychrophilum* |
| | 0.741 | *Acidovorax facilis* CCUG 2113 (T). | beta | Acidovorax | N/A | Acidovorax | *Av. avenae* |
| | 0.741 | *Xylophilus ampelinus* ATCC 33914 (T). | beta | Acidovorax | N/A | Acidovorax | *Xp. ampelin* |
| #89 | 0.977 | *Pseudomonas aeruginosa*. | gamma | Pseudomonas and Relatives | N/A | *Ps. aeruginosa* | N/A |
| | 0.975 | *Pseudomonas aeruginosa* LMG 1242 (T). | gamma | Pseudomonas and Relatives | N/A | *Ps. aeruginosa* | N/A |
| | 0.962 | *Pseudomonas* sp. str. CRE 11. | gamma | Pseudomonas and Relatives | N/A | *Ps. aeruginosa* | N/A |
| #108 | 0.886 | *Pseudomonas aeruginosa*. | gamma | Pseudomonas and Relatives | N/A | *Ps. aeruginosa* | N/A |
| | 0.880 | *Pseudomonas* sp. str. CRE 11. | gamma | Pseudomonas and Relatives | N/A | *Ps. aeruginosa* | N/A |
| | 0.873 | *Pseudomonas aeruginosa* LMG 1242 (T). | gamma | Pseudomonas and Relatives | N/A | *Ps. aeruginosa* | N/A |
| #151 | 0.897 | *Pseudomonas aeruginosa*. | gamma | Pseudomonas and Relatives | N/A | *Ps. aeruginosa* | N/A |
| | 0.881 | *Pseudomonas* sp. str. CRE 11. | gamma | Pseudomonas and Relatives | N/A | *Ps. aeruginosa* | N/A |
| | 0.881 | *Pseudomonas aeruginosa* LMG 1242 (T). | gamma | Pseudomonas and Relatives | N/A | *Ps. aeruginosa* | N/A |
| HOD 1[g] | 0.760 | *Rhodocyclus tenuis* str. 3760 DSM 110. | beta | Azoarcus | N/A | *Rcy. tenuis* | N/A |
| | 0.730 | *Rhodocyclus purpureus* str. 6770 DSM 168 (T). | beta | Azoarcus | N/A | *Rcy. tenuis* | N/A |
| | 0.709 | *Rhodocyclus tenuis* str. 2761 DSM 109 (T). | beta | Azoarcus | N/A | *Rcy. tenuis* | N/A |
| HOD 3[g] | 0.776 | *Rhodocyclus tenuis* str. 3760 DSM 110. | beta | Azoarcus | N/A | *Rcy. tenuis* | N/A |
| | 0.719 | *Rhodocyclus purureus* str. 6770 DSM 168 (T). | beta | Azoarcus | N/A | *Rcy. tenuis* | N/A |
| | 0.711 | *Rhodocyclus tenuis* str. 2761 DSM 109 (T). | beta | Azoarcus | N/A | *Rcy. tenuis* | N/A |
| HOD 4[g] | 0.757 | *Rhodocyclus tenuis* str. 3760 DSM 110. | beta | Azoarcus | N/A | *Rcy. tenuis* | N/A |
| | 0.705 | *Rhodocyclus tenuis* str. 2761 DSM 109 (T). | beta | Azoarcus | N/A | *Rcy. tenuis* | N/A |
| | 0.705 | *Rhodocyclus tenuis* str. SW18. | beta | Azoarcus | N/A | *Rcy. tenuis* | N/A |
| HOD 5[g] | 0.870 | *Rhodocyclus tenuis* str. 2761 DSM 109 (T). | beta | Azoarcus | N/A | *Rcy. tenuis* | N/A |
| | 0.867 | *Rhodocyclus tenuis* str. SW18. | beta | Azoarcus | N/A | *Rcy. tenuis* | N/A |
| | 0.860 | *Rhodocyclus tenuis* str. DSM 110. | beta | Azoarcus | N/A | *Rcy. tenuis* | N/A |
| HOD 6[g] | 0.774 | *Rhodocyclus tenuis* str. 3760 DSM 110. | beta | Azoarcus | N/A | *Rcy. tenuis* | N/A |
| | 0.723 | *Rhodocyclus purpureus* str. 6770 DSM 168 (T). | beta | Azoarcus | N/A | *Rcy. tenuis* | N/A |
| | 0.713 | *Rhodocyclus tenuis* str. 2761 DSM 109 (T). | beta | Azoarcus | N/A | *Rcy. tenuis* | N/A |
| HOD 7[g] | 0.955 | *Sinorhizobium fredii* str. LMG 6217 (T). | alpha | Rhizobium-Agrobacterium | N/A | *Srh. fredii* | N/A |
| | 0.954 | *Sinorhizobium fredii* ATCC 35423 (T). | alpha | Rhizobium-Agrobacterium | N/A | *Srh. fredii* | N/A |

TABLE 3-continued

Summary of Sequence Match results[a]

| Isolate | $S_{ab}$[b] | Full name[c] | Subdivision[d] | Group[e] | Group[e] | Subgroup[e] | Subgroup[e] |
|---|---|---|---|---|---|---|---|
| | 0.947 | *Sinorhizobium xinjiangensis* IAM 14142. | alpha | Rhizobium-Agrobacterium | N/A | *Srh. fredii* | N/A |
| HOD 8[g] | 0.775 | *Rhodocyclus tenuis* str. 3760 DSM 110. | beta | Azoarcus | N/A | *Rcy. tenuis* | N/A |
| | 0.721 | *Rhodocyclus purpureus* str. 6770 DSM 168 (T). | beta | Azoarcus | N/A | *Rcy. tenuis* | N/A |
| | 0.717 | *Rhodocyclus tenuis* str. 2761 DSM 109 (T). | beta | Azoarcus | N/A | *Rcy. tenuis* | N/A |
| HOD 9[g] | 0.797 | *Rhodocyclus tenuis* str. 3760 DSM 110. | beta | Azoarcus | N/A | *Rcy. tenuis* | N/A |
| | 0.744 | *Rhodocyclus purpureus* str. 6770 DSM 168 (T). | beta | Azoarcus | N/A | *Rcy. tenuis* | N/A |
| | 0.740 | *Rhodocyclus tenuis* str. 2761 DSM 109 (T). | beta | Azoarcus | N/A | *Rcy. tenuis* | N/A |

[a]includes the top three RDP Sequence Matches that contain at least 1000 base pairs and have been aligned to the RDP tree
[b]$S_{ab}$ scores range from 0 to 1, with 1 being the closest match possible with a database sequence (see text for complete explanation)
[c]full name of database strain as registered with the RDP (may include accession numbers for culture collections)
[d]based on the tree posted by the RDP; all strains listed belong to subdivisions of the Proteobacteria
[e]phylogenetic groupings on the RDP tree are arranged as a series of nesting hierarchies (e.g., Groups within Groups)
[f]not applicable
[g]Cape Cod isolate of Smith et al. (1994)

Sequence Match analyses suggest that those isolates reducing nitrate in the presence of hydrogen in excess of a threshold amount (20% of 1 mM) fall into two subdivision of the Proteobacteria. The 16S rRNA gene sequences of isolates 27, 31, and 65 are most similar to those of *Paracoccus denitrificans* strains in the Par. denitrificans subgroups of the Paracoccus subgroup of the Rhodobacter group, which belongs to the alpha subdivision of the Proteobacteria. The sequence of isolate 202 is most similar to that of a strain of *Achromobacter xylosoxidans* subsp. denitrificans in the Brd. bronchiseptica subgroup of the Bordatella group, which belongs to the beta subdivision of the Proteobacteria. The 16S rRNA gene sequences of isolates 12, HOD1, HOD3, HOD4, HOD5, HOD6, HOD8, and HOD9 are most similar to those of *Rhodocyclus tenuis* strains in the Rcy. tenuiis subgroup of the Azoarcus group, which belongs to the beta subgroup of the Proteobacteia. The 16S rRNA gene sequence of HOD7 is most similar to strains of *Sinorhizobium fredii* in the Snr. fredii subgroup of the Rhizobium-Agrobacterium group, which belongs to the alpha subdivision of the Proteobacteria.

Sequence match results suggest that those isolates producing less than, but at least 10 percent of, the threshold amount of nitrate reduced in the presence of hydrogen fall into three subdivisions of the Proteobacteria. The 16S rRNA gene sequence of isolate 102 is most similar to that of a strain of *Ochrobactrum anthropi* in the Brucella assemblage of the Rhizobium-Agrobacterium group, which belongs to the alpha subdivision of the Proteobacteria. The 16S rRNA gene sequence of isolate 155 is most similar to that of a strain of *Ralstonia eutropha* in the Ral. eutropha group, which belongs to the beta subdivision of the Proteobacteria. The 16S rRNA gene sequence of isolate 204 is most similar to that of a strain of *Acidovorax avenae* subsp. citrulli in the Av. avenae subgroup of the Acidovorax subgroup of the Acidovorax group, which belongs to the beta subdivision of the Proteobacteria. The 16S rRNA gene sequence of isolate 205 is most similar to that of a strain of *Aquaspirillum psychrophilum* in the Aqsp. psychrophilum subgroup of the Acidovorax subgroup of the Acidovorax group, which belongs to the beta subdivision of the Proteobacteria. The 16S rRNA gene sequences of isolates 89, 108, and 151 are most similar to those of a *Pseudomonas aeruginosa* strain in the Ps. aeruginosa subgroup of the Pseudomonas and relatives group, which belongs to the gamma subdivision of the Proteobacteria.

Table 4 provides raw data from 16S ribosomal RNA gene sequencing.

TABLE 4

Raw data from 16S ribosomal RNA gene sequencing
A = Adenine, T = Thymine, C = Cytosine, G = Guanine,
N = unknown; see Methods section from Wahlquist (2000)
for explanation of sequencing method Isolate #12 full (six-primer) sequence

```
  1    AGAGTTTGAT CCTGGCTCAG ATTGAACGCT GGCGGCATGC CTTACACATG
 51    CAAGTCGAAC GGCAGCACGG GAGCTTGCTC CTGGTGGCGA GTGGCGAACG
101    GGTGAGTAAT GCATCGGAAC GTGCCCTGAA GTGGGGGATA ACGCAGCGAA
151    AGTTGCGCTA ATACCGCATA TTCTGTGAGC AGGAAAGCAG GGGATCGCAA
201    GACCTTGCGC TTTAGGAGCG GCCGATGTCG GATTAGCTAG TTGGTGGGGT
251    AAAGGCTCAC CAAGGCGACG ATCCGTAGCG GGTCTGAGAG GATGATCCCC
301    CACACTGGGA CTGAGACACG GCCCAGACTC CTACGGGAGG CAGCAGTGGG
351    GAATTTTGGA CAATGGGCGA AAGCCTGATC CAGCCATGCC GCGTGAGTGA
401    AGAAGGCCTT CGGGTTGTAA AGCTCTTTCG GCGGGGAAGA AATCGCATTC
451    TCTAATACAG GATGTGGATG ACGGTACCCG AATAAGAAGC ACCGGCTAAC
```

TABLE 4-continued

Raw data from 16S ribosomal RNA gene sequencing
A = Adenine, T = Thymine, C = Cytosine, G = Guanine,
N = unknown; see Methods section from Wahlquist (2000)
for explanation of sequencing method

```
 501    TACGTGCCAG CAGCCGCGGT AATACGTAGG GTGCGAGCGT TAATCGGAAT
 551    TACTGGGCGT AAAGCGTGCG CAGGCGGTTT CGTAAGACAG ACGTGAAATC
 601    CCCGGGCTCA ACCTGGGAAC TGCGTTTGTG ACTGCGAGGC TAGAGTTTGG
 651    CAGAGGGGGG TGGAATTCCA CGTGTAGCAG TGAAATCCGT AGAGATGTGG
 701    AGGAACACCG ATGCGAAGG CAGCCCCCTG GGCCAATACT GACGCTCATG
 751    CACGAAAGCG TGGGGAGCAA ACAGGATTAG ATACCCTGGT AGTCCACGCC
 801    CTAAACGATG TCAACTAGGT GTTGGGAGGG TTAAACCTCT TAGTGCCGTA
 851    GCTAACGCGT GAAGTTGACC GCCTGGGGAG TACGGCCGCA AGGCTAAAAC
 901    TCAAAGGAAT TGACGGGGAC CCGCACAAGC GGTGGATGAT GTGGATTAAT
 951    TCGATGCAAC GCGAAAAACC TTACCTACCC TTGACATGTC AGGAATCCCG
1001    GAGAGATTTG GGAGTGCCCG AAAGGGAGCC TGAACACAGG TGCTGCATGG
1051    CTGTCGTCAG CTCGTGTCGT GACATGTTGG GTTAAGTCCC GCAACGAGCG
1101    CAACCCTTGT CGTTAATTGC CATCATTCAG TTGGGCACTT TAATGAGACT
1151    GCCGGTGACA AACCGGAGGA AGGTGGGGAT GACGTCAAGT CCTCATGGCC
1201    CTTATGGGTA GGGCTTCACA CGTCATACAA TGGTCGGTCC AGAGGGTTGC
1251    CAACCCGCGA GGGGGAGCTA ATCTCAGAAA GCCGATCGTA GTCCGGATTG
1301    CAGTCTGCAA CTCGACTGCA TGAAGTCGGA ATCGCTAGTA ATCGCGGATC
1351    AGCATGTCGC GGTGAATACG TTCCCGGGTC TTGTACACAC CGCCCGTCAC
1401    ACCATGGGAG CGGGTTCTGC CAGAAGTAGT TAGCCTAACC GCAAGGAGGG
1451    CGATTACCAC GGCAGGGTTC GTGACTGGGG TGAAGTCGTA ACAAGGTAAC
1501    C
```
Isolate #27 one-primer (519r) sequence

```
   1    CCGGGGCTTC TTCTGCTGGT ACCGTCATTA TCTTCCCAGC TGAAAGAGCT
  51    TTACAACCCT AGGGCCTTCA TCACTCACGC GGCATGGCTA GATCAGGGTT
 151    GCCCCCATTG TCTAAGATTC CCCACTGCTG CCTCCCGTAG GAGTCTGGGC
 201    CGTGTCTCAG TCCCAGTGTG GCTGATCATC CTCTCAAACC AGCTATGGAT
 251    CGTCGGCTTG GTAGGCCATT ACCCCACCAA CTACCTAATC CAACGCGGG
 301    TAATCCTTTG GCGATAAATC TTTCCCCCGA AGGGCGCATA CGGTATTACC
 351    CCCAGTTTCC CAGGACTATT CCGTACCAAA GGGCATATTC CCACGCCGTT
 401    ACTCACCCGT CCGCCGCTCA CCCCGAAGGG TGCGCTCGAC TTGCATGTGT
 451    TAGGCCTGCC GCAGCGTTCG TTCTGAGCCA GGATCAAACT CTGTTGCNCC
 501    AATTCGG
```
Isolate #31 full (six-primer) sequence

```
   1    AGAGTTTGAT CCTGGCTCAG AACGAACGCT GGCGGCAGGC CTAACACATG
  51    CAAGTCGAGC GCACCCTTCG GGGTGAGCGG CGGACGGGTG AGTAACGCGT
 151    GGGAATATGC CCTTTGGTAC GGAATAGTCC TGGGAAACTG GGGGTAATAC
 201    CGTATGCGCC CTTCGGGGGA AGATTTATC GCCAAAGGAT TAGCCCGCGT
 251    TGGATTAGGT AGTTGGTGGG GTAATGGCCT ACCAAGCCGA CGATCCATAG
 301    CTGGTTTGAG AGGATGATCA GCCACACTGG GACTGAGACA CGGCCCAGAC
 351    TCCTACGGGA GGCAGCAGTG GGAATCTTA GACAATGGGG GCAACCCTGA
 401    TCTAGCCATG CCGCGTGAGT GATGAAGGCC CTAGGGTTGT AAAGCTCTTT
 451    CAGCTGGGAA GATAATGACG GTACCAGCAG AAGAAGCCCC GGCTAACTCC
 501    GTGCCAGCAG CCGCGGTAAT ACGGAGGGGG CTAGCGTTGT TCGGAATTAC
 551    TGGGCGTAAA GCGCACGTAG GCGGACCGGA AAGTTGGGG TGAAATCCCG
 601    GGGCTCAACC CCGGAACTGC CTTCAAAACT ATCGGTCTGC AGTTCGAGAG
 651    AGGTGAGTGG AATTCCGAGT GTAGAGGTGA AATTCGTAGA TATTCGGAGG
 701    AACACCAGTG GCGAAGGCGG CTCACTGGCT CGATACTGAC GCTCAGGTGC
 751    GAAAGCGTGG GGAGCAAACA GGATTAGATA CCCTGGTAGT CCACGCCGTA
 801    AACCATGAAT GCCAGTCGTC GGGCAGCATG CTGTTCGGTG ACACACCTAA
 851    CGGATTAAGC ATTCCGCCTG GGGAGTACGG TCGCAAGATT AAAACTCAAA
 901    GGAATTGACG GGGGCCCGCA CAAGCGGTGG AGCATGTGGT TTAATTCGAA
 951    GCAACGCGCA GAACCTTACG AACCCTTGAC ATCCCAGGAC CGGCCCGGAG
1001    ACGGGTCTTT CACTTCGGTG ACCTGGAGAC AGGTGCTGCA TGGCTGTCGT
1051    CAGCTCGTGT CGTGAGATGT TCGGTTAAGT CCGGCAACGA GCGCAACCCA
1101    CACTCTTAGT TGCCAGCATT TGGTTGGGCA CTCTAAGAA ACTGCCGATG
1151    ATAAGTCGGA GGAAGGTGTG GATGACGTCA AGTCCTCATG GCCCTTACGG
1201    GTTGGGCTAC ACACGTGCTA CAATGGTGGT GACAGTGGGT TAATCCCCAA
1251    AAGCCATCTC AGTTCGGATT GGGGTCTGCA ACTCGACCCC ATGAAGTTGG
1301    AATCGCTAGT AATCGCGGAA CAGCATGCCG CGGTGAATAC GTTCCCGGGC
1351    CTTGTACACA CCGCCCGTCA CACCATGGGA GTTGGGTCTA CCCGACGGCC
1401    GTGCGCTAAC CAGCAATGGG GGCAGCGGAC CACGGTAGGC TCAGCGACTG
1451    GGGTGAAGTC GTAACAAGGT AACC
```
Isolate #65 full (six-primer) sequence

```
   1    AGAGTTTGAT CCTGGCTCAG AACGAACGCT GGCGGCAGGC CTAACACATG
  51    CAAGTCGAGC GCACCCTTCG GGGTGAGCGG CGGACGGGTG AGTAACGCCT
 101    GGGAATATGC CCTTTGGTAC GGAATAGTCC TGGGAAACTG GGGGTAATAC
 151    CGTATGCGCC CTTCGGGGGA AGATTTATC GCCAAAGGAT TAGCCCGCGT
 201    TGGATTAGGT AGTTGGTGGG GTAATGGCCT ACCAAGCCGA CGATCCATAG
 251    CTGGTTTGAG AGGATGATCA GCCACACTGG GACTGAGACA CGGCCCAGAC
 301    TCCTACGGGA GGCAGCAGTG GGAATCTTA GACAATGGGG GCAACCCTGA
 351    TCTAGCCATG CCGCGTGAGT GATGAAGGCC CTAGGGTTGT AAAGCTCTTT
```

TABLE 4-continued

Raw data from 16S ribosomal RNA gene sequencing
A = Adenine, T = Thymine, C = Cytosine, G = Guanine,
N = unknown; see Methods section from Wahlquist (2000)
for explanation of sequencing method

```
 401    CAGCTGGGAA GATAATGACG GTACCAGCAG AAGAAGCCCC GGCTAACTCC
 451    GTGCCAGCAG CCGGCGGTAA TACGGAGGGG CTAGCGTTG  TTCGGAATTA
 501    CTGGGCGTAA AGCGCACGTA GGCGGACCGG AAAGTTGGGG GTGAAATCCC
 551    GGGGCTCAAC CCCGGAACTG CCTTCAAAAC TATCGGTCTG GAGTTCGAGA
 601    GAGGTGAGTG GAATTCCGAG TGTAGAGGTG AAATTCGTAG ATATTCGGAG
 651    GAACACCAGT GGCGAAGGCG GCTCACTGGC TCGATACTGA CGCTGAGGTG
 701    CGAAAGCGTG GGGAGCAAAC AGGATTAGAT ACCCTGGTAG TCCACGCCGT
 751    AAACGATGAA TGCCAGTCGT CGGGCAGCAT GCTGTTCGGT GACACACCTA
 601    ACGGATTAAG CATTCCGCCT TGGGGAGTAC GGTCGCAAGA TTAAAACTCA
 651    AAGGAATTGA CGGGGGCCCG CACAAGCGGT GGAGCATGTG GTTTAATTCG
 901    AAGCAACGCG CAGAACCTTA CCAACCCTTG ACATCCCAGG ACCGGCCCGG
 951    AGACGGGTCT TTCACTTCGG TGACCTGGAG ACAGGTGCTG CATGGCTGTC
1001    GTCAGCTCGT GTCGTGAGAT GTTCGGTTAA GTCCGGCAAC GAGCGCAACC
1051    CACACTCTTA GTTGCCAGCA TTTGGTTGGG CACTCTAAGA GAACTGCCGA
1101    TGATAAGTCG GAGGAAGGTC TGGATGACGT CAAGTCCTCA TGGCCCTTAC
1151    GGGTTGGGCT ACACACGTGC TACAATGGTG GTGACAGTGG GTTAATCCCC
1201    AAAAGCCATC TCAGTTCGGA TTGGGGTCTG CAACTCGACC CCATGAAGTT
1251    CGAATCGCTA GTAATCGCGG AACAGCATGC CGCGGTGAAT ACGTTCCCGG
1301    GCCTTGTACA CACCGCCCGT CACACCATGG GAGTTGGGTC TACCCGACGG
1351    CCGTGCGCTA ACCAGCAATG GGGGCAGCGG ACCACGGCTA GGCTCAGCGA
1401    CTGGGGTGAA GTCGTAACAA GGTAACC
Isolate #202 one-primer (519r) sequence 1    GCCGGTGCTA TTCTGCAGGT ACCGTCAGTT CCGCGGGGTA TTAACCCGCG
  51    ACGTTTCTTT CCTGCCAAAA GTGCTTTACA ACCCGAAGGC CTTGATCGCA
 101    CACGCGGGAT GGCTGGATCA GGGTTTCCCC CATTGTCCAA AATTCCCCAC
 151    TGCTGCCTCC CGTAGGAGTC TGGGCCGTGT CTCAGTCCCA GTGTGGCTGG
 201    TCGTCCTCTC AAACCAGCTA CGGATCGTCG CCTTGGTGAG CCGTTACCCC
 251    ACCAACTAGC TAATCCGATA TCGGCCGCTC CAATAGTGCA AGGTCTTGCG
 301    ATCCCCTGCT TTCCCCCGTG GGGCGTATGC CGTATTAAGC CACGCTTTCG
 351    CGTAGTTATC CCCCGCTACT GGGCACGTTC CGATACATTA CTCACCCGTT
 401    CCCCACTCGC CACCAGACCG AAGTCCGTGC TGCCGTCGAC TTGCATGTGT
 451    AAGGCATCCC GTAGCGTTAA TCTGAGCCAN GATAAACTCT GTGCGNCAAA
 501    NTCGG
Isolate #102 one-primer (519r) sequence 1    CGGGGCTTCT TCTCCGGTTA CCGTCATTAT CTTCACCGGT GAAAGAGCTT
  51    TACAACCCTA GGGCCTTCAT CACTCACCCG GCATGGCTGG ATCAGGCTTG
 101    CGCCCATTGT CCAATATTCC CCACTGCTGC CTCCCGTAGG AGTCTGGGCC
 151    GTGTCTCAGT CCCAGTGTGG CTGATCATCC TCTCAGACCA GCTATGGATC
 201    GTCGCTTGGT GAGCCTTTAC CTCACCAACT AGCTAATCCA ACGCGGGCCG
 251    ATCCTTTGCC GATAAATCTT TCCCCCGAAG GGCACATACG GTATTAGCAC
 301    AAGTTTCCCT GAGTTATTCC GTAGCAAAAG GTACGTTCCC ACGCGTTACT
 351    CACCCGTCTG CCGCTCCCCT TGCGGGGCGC TCGACTTGCA TGTGTTAAGC
 401    CTGCCGCAGC GTTCGTTCTG AGCCAGGATC AAACTCTGTT GTCNCNAATT
 451    CGG
Isolate #155 one-primer (519r) sequence 1    CGTAGTTAGC CGGTGCTTAT TCTTCCGGTA CCGTCATCGA CGCCGGGTAT
  51    TAACCAGCGC CATTTCTTTC CGGACAAAAG TGCTTTACAA CCCGAAGGCC
 101    TTCTTCACAC ACGCGGCATT GCTGGATCAG GGTTGCCCCC ATTGTCCAAA
 151    ATTCCCCACT GCTGCCTCCC GTAGGAGTCT GGGCCGTGTC TCAGTCCCAG
 201    TGTGGCTGAT CGTCCTCTCA GACCAGNTAC CTGATCGTCG CCTTGGTAGG
 251    CTCTTACCCC ACCAACTAGC TAATCAGACA TCGGCCGCTC CTGTCGCGCG
 301    AGGCCGTNAC CGGTCCCNCN CTTTCACNCT CAGGTCGTAT GCGGTATTAA
 351    CCTAATCTTT CGACTAGNTA TCCCCCACGA NAGGNCACGT TCCGATGTAT
 401    ACTCACNCGT TCGCACTCGC CANCAGGCCG AAGCCCGNNC TGCCGTCNCT
 451    TGATGTGAAG GATGCCGCAG CGTTAAC
Isolate #204 one-primer (519r) sequence 1    TTCTTACGGT ACCGTCATGA CCCCTCTTTA TTAGAAAGAG CTTTTTCGTT
  51    CCGTACAAAA GCAGTTTACA ACCCGAAGGC CTTCATCCTG CACGCGGCAT
 101    GGCTGGATCA GGCTTTCGCC CATTGTCCAA AATTCCCCAC TGCTGCCTCC
 151    CGTAGGAGTC TGGGCCGTGT CTCAGTCCCA GTGTGGCTTG ATCATCCTCT
 201    CAGACCAGCT ACAGATCGTC GGCTTGGTAA GCTTTTATCC CACCAACTAC
 251    CTAATCTGCC ATCGGCCGCT CCGTCCGCGC GAGGTCCGAA GATCCCCCGC
 301    TTTCATCCGT AGATCGTATG CGGTATTAGC AAAGCTTTCG CCTCGTTATC
 351    CCCCACGATC GGGCACGTTC CGATGTATTA CTACCCGTTC GCACTCGTCA
 401    GCATCCGAAG ACCTGGTACC GTNCGACTTG CATGTGTAAG GCATGCCGCA
 451    GCGTTAANCT GAGCNAGGA  TCAAACTCTG TTGCCACGA
Isolate #205 one-primer (519r) sequence 1    CGGTGCTTAT TCTTACGGTA CCGTCTGACC CCTCTTTATT AGAAAGAGGC
  51    TTTTCGTTCC GTACAAAAGC AGTTTACAAC CCGAAGGCCT TCATCCTGCA
```

TABLE 4-continued

Raw data from 16S ribosomal RNA gene sequencing
A = Adenine, T = Thymine, C = Cytosine, G = Guanine,
N = unknown; see Methods section from Wahlquist (2000)
for explanation of sequencing method

```
101       CGCGGCATGG CTGGATCAGG CTTTCGCCCA TTGTCCAAAA TTCCCCACTG
151       CTGCCTCCCG TAGGAGTCTG GGCCGTGTCT CAGTCCCAGT GTGGCNTGAT
201       CATCCTCTCA GACCAGCTAC AGATCGTCGG CTTGGTAAGC TTTTATCCCA
251       CCAACTACCT AATCTGCCAT CGGCCGCTCC GTCCGCGCGA GGTCCGAAGA
301       TCCCCCGCTT TCATCCGTAG ATCGTATGCG GTATTAGCAA AGCTNGGGCC
351       TCGTTRTCCC CCACGATCGG GCACGTTCCG ATGTATTACT CACCCGTTCG
401       CCACTCGTCA GCATCCGAAG ACCTGTTACC GTTCGACTTG GATGTGTAAG
451       GCATGCCGCA GCGTTCATCT GAGCCANGAT CAACTCTGTG GCGACCAA
```
Isolate #89 full (six-primer) sequence

```
  1       AGAGTTTGAT CCTGGCTCAG ATTCAACGCT GGCGGCAGGC CTAACACATG
 51       CAAGTCGAGC GGATGAGGGG AGCTTGCTCC TGGATTCAGC GGCGGACGGG
101       TGAGTAATGC CTAGGAATCT GCCTGGTAGT GGGGGATAAC GTCCGGAAAC
151       GGGCGCTAAT ACCGCATACG TCCTGAGGGA GAAAGTGGGG GATCTTCGGA
201       CCTCACGCTA TCAGATGAGC CTAGGTCGGA TTAGCTAGTT GGTGGGGTAA
251       AGGCCTACCA AGGCGACGAT CCGTAACTGG TCTGAGAGGA TGATCAGTCA
301       CACTGGAACT GAGACACGGT CCAGACTCCT ACGGGAGGCA GCAGTGGGGA
351       ATATTGGACA ATGGGCGAAA GCCTGATCCA GCCATGCCGC GTGTGTCAAG
401       AAGGTCTTCG GATTGTAAAG CACTTTAAGT TGGGAGGAAG GGCAGTAAGT
451       TAATACCTTG CTCTTTTGAC GTTACCAACA GAATAAGCAC CGGCTAACTT
501       CGTGCCAGCA GCCGCGGTAA TACGAAGGGT GCAAGCGTTA ATCGGAATTA
551       CTGGGCGTAA AGCGCGCGTA GGTGGTTCAG CAAGTTGCAT GTGAAATCCC
601       CGGGCTCAAC CTGGGAACTG CATCCAAAAC TACTGAGCTA GAGTACGGTA
651       GAGGGTGGTG GAATTTCCTG TGTAGCGGTG AAATGCGTAG ATATAGGAAG
701       GAACACCAGT GGCGAAGGCG ACCACCTGGA CTGATACTGA CACTGAGGTG
751       CGAAAGCGTG GGGAGCAAAC AGGATTAGAT ACCCTGGTAG TCCACGCCGT
801       AAACGATGTC GACTAGCCGT TGGGATCCTT GAGATCTTAG TGGCGCAGCT
851       AACGCGATAA GTCGACCGCC TGGGGAGTAC GGCCGCAAGG TTAAAACTCA
901       AATGAATTGA CGGGGGCCCG CACAAGCGGT GCAGCATGTG GTTTAATTCG
951       AAGCAACGCG AAGAACCTTA CCTGGCCTTG ACATGCTGAG AACTTTCCAG
1001      AGATGGATTG GTGCCTTCGG GAACTCAGAC ACAGGTGCTG CATGGCTGTC
1051      GTCAGCTCGT GTCGTGAGAT GTTGGGTTAA GTCCCGTAAC GAGCGCAACC
1101      CTTGTCCTTA GTTACCAGCA CCTCGGGTGG GCACTCTAAG GAGACTGCCG
1151      GTGACAAACC GGAGGAAGGT GGGGATGACG TCAAGTCATC ATGGCCCTTA
1201      CGGCCAGGGC TACACACGTG CTACAATGGT CGGTACAAAG GGTTGCCAAG
1251      CCGCGAGGTG GAGCTAATCC CATAAAACCG ATCGTAGTCC GGATCGCAGT
1301      CTGCAACTCG ACTGCGTGAA GTCGGAATCG CTAGTAATCG TGAATCAGAA
1351      TGTCACGGTG AATACGTTCC CGGGCCTTGT ACACACCGCC CGTCACACCA
1401      TGGGAGTGGG TTGCTCCAGA AGTAGCTAGT CTAACCGCAA GGGGGACGGT
1451      TACCACGGAG TGATTCATGA CTGGGGTGAA GTCGTAACAA GGTAACC
```
Isolate #108 one-primer (519r) sequence

```
  1       GTCGANTTGC CGGTGCTATT CTGTTGGTAA CGTCAAAAAC ACCAAGGTAT
 51       TAACTTACTG CCCTTCCTCC CAACTTAAAG TGCTTTACAA TCCGAAGACC
101       TTCTTCACAC ACGCGGCATG GCTGGATCAG GCTTTCGCCC ATTGTCCAAT
151       ATTCCCCACT GCTGCCTCCC GTAGGAGTCT GGACCGTGTC TCAGTTCCAG
201       TGTGACTGAT CATCCTCTCA GACCAGTTAC GGATCGTCGC TTGGTAGGCC
251       TTTACCCCAC CAACTAGCTA ATCCGACCTA GGCTCATCTG ATAGCGTGAG
301       GTCCGAAGAT CCCCCACTTT CTCCCTCAGG ACGTATGCNN GTATTAGCGC
351       CCGTTTCCGG ACGTTATCCC CCACTACCAG GCAGATTCCT AGGCATTACT
401       CACCCGTCCG CCGCTGAATC CAGGAGCAAG CTCCCTTCAT CCGCTCGACT
451       TGCATGTGTT AGGCCTGCCG CCAGCGTTCA ATCTGAGCCA NGATCAAACT
501       CTGTTGTCAC GAAATTCGG
```
Isolate #151 one-primer (519r) sequence

```
  1       GTGCTATTCT GTTGGTAACG TCAAAACAGC AAGGTATTAA CTTACTGCCC
 51       TTCCTCCCAA CTTAAAGTGC TTTACAATCC GAAGACCTTC TTCACACACG
101       CGGCATGGCT GCATCAGGCT TTCGCCCATT GTCCAATATT CCCCACTGCT
151       GCCTCCCGTA GGAGTCTGGA CCGTGTCTCA GTTCCAGTGT GACTGATCAT
201       CCTCTCAGAC CAGTTACGGA TCGTCGCTTG GTAGGCCTTT ACCCCACAAC
251       TAGCTAATCC GACCTAGGCT CATCTGATAG CGTGAGGTCC GAAGATCCCC
301       CACTTTCTCC CTCAGGACGT ATGCGGTATT AAGCGCCCGT TTCCGGACGT
351       TATCCCCCAC TACCAGGCAG ATTCCTAGGC ATTACTCACC CGTCCGCCGC
401       TGAATCCAGG AGCAAGCTCC CTTCATCGCT CGACTTGCAT GTGTTAGGCC
451       TGCCGCAGCG TTAATCTGAG CCAGGATCAA AC
```
HOD 1 one-primer (519r) sequence

```
  1       TCGTAGTCCG CCGGTGCTTC TTATTCGGGT ACCGTCATCC ACATCCTGTA
 51       TTACGAGAAT GCGATTTCTT CCCCGCCGAA AGAGCTTTAC AACCCGAAGG
101       CCTTCTTCAC TCACGCGGCA TGGCTGGATC AGGCTTTCGC CCATTGTCCA
151       AAATTCCCCA CTGCTGCCTC CCGTAGGAGT CTGGGCCGTG TCTCAGTCCC
201       AGTGTGGCGG ATCATCCTCT CACACCCGCT ACGGATCGTC GCCTTGGTGA
251       GCCTTTACCC CACCAACTAG CTAATCCGAC ATCGGCCGCT CCTAAAGCGC
301       AAGGTCTTGC GANCCCCTGC TTTCCTGCTC ACAGAATATG CGGTATTAGC
```

TABLE 4-continued

Raw data from 16S ribosomal RNA gene sequencing
A = Adenine, T = Thymine, C = Cytosine, G = Guanine,
N = unknown; see Methods section from Wahlquist (2000)
for explanation of sequencing method

```
351       GCAACTTTCG CTGCGTTATC CCCCACTTCA GGGCACGTTC CGATGCATTA
401       CTCACCCGTT CGCCACTCGC CACCAGGAGC AAGCTCCCGT GCTGCCGTTC
451       GACTTGCATG TGTAAGGCAT GCCGCCAGCG TTCAATCTGA GCCAGGATCA
501       AACTCTGTTG TCACGAAATT CGG
```
HOD 3 one-primer (519r) sequence

```
  1       AGTNGCCGGT GCTTCTTATT CGGGTACCGT CATCCACATC CTGTATTAGA
 51       GAATGCGATT TCTTCCCCGC CGAAAGAGCT TTACAACCCG AAGGCCTTCT
101       TCACTCACGC GGCATGGCTG GATCAGGCTT TCGCCCATTG TCCAAAATTC
151       CCCACTGCTG CCTCCCGTAG GAGTCTGGGC CGTGTCTCAG TCCCAGTGTG
201       GCGGATCATC CTCTCAGACC CGCTACGGAT CGTCGCTTGG TGAGCCTTTA
251       CCCCACCAAC TAGCTAATCC GACATCGGCC GCTCCTAAAG CGCAAGGTCT
301       TGCGATCCCC TGCTTTCCTG CTCACAGAAT ATGCGGTATT AAGCGCAACT
351       TTCGCTTGCG TTATCCCCCA CTTCAGGGCA CCTTCCGATG CATTACTCAC
401       CCGTTCGCCA CTCGCCACCA GGAGCAAGCT CCCGTGCTGC CGTTCGACTT
451       GCATGTGTAA GGCATGCCGC CAGCGTTCAA TCTGAGCCAN GATCAAACTC
501       TGTTGTCACG NAAATTCGG
```
HOD 4 one-primer (519r) sequence

```
  1       AGTNCGCCGG TGCTTCTTAT TCGGGTACCG TCATCCACAT CCTGTATTAN
 51       GAGAATGCGA TTTCTTCCCC GCCGAAAGAG CTTTACAACC CGAAGGCCTT
101       CTTCACTCAC GCGGCATGGC TGGATCAGGC TTTCGCCCAT TGTCCAAAAT
151       TCCCCACTGC TGCCTCCCGT AGGAGTCTGG GCCGTGTCTC AGTCCCAGTG
201       TGGCGGATCA TCCTCTCAGA CCCGCTACGG ATCGTCGCCT TGGTGAGCCT
251       TTACCCCACC AACTAGCTAA TCCGACATCG GCCGCTCCTA AAGCGCAAGG
301       TCTTGCGATC CCCTGCTTTC CTGCTCACAG AATATGCGGT ATTAGCGCAA
351       CTTTCGCTTG CGTTATCCCC CACTTCACGG CACGTTCCGA TGCATTACTG
401       ACCCGTTCGC CACTCGCCAC CAGGAGCAAG CTCCCGTGCT GCCGTTCGAC
451       TTGCATGTGT AAGGCATGCC GCCAGNGTTC AATCTGAGCC ANGATCAAAC
501       TCTGTTGTCA CGAATTCGGN NNNNC
```
HOD 5 full (six-primer) sequence

```
  1       AGAGTTTGAT CCTGGCTCAG ATTGAACGCT GGCGGCATGC CTTACACATG
 51       CAAGTCGAAC GGCAGCACGG GAGCTTGCTC CTGGTGGCGA GTGGCGAACG
101       GGTGAGTAAT GCATCGGAAC GTGCCCTGAA GTGGGGGATA ACGCAGCGAA
151       AGTTGCGCTA ATACCGCATA TTCTGTGAGC AGGAAAGCAG GGGATCGCAA
201       GACCTTGCGC TTTAGGAGCG GCCGATGTCG GATTAGCTAG TTGGTGGGGT
251       AAAGGCTCAC CAAGGCGACG ATCCGTAGCG GTCTGAGAG GATGATCCGC
301       CACACTGGGA CTGAGACACG GCCCAGACTC CTACGGGAGG CAGCAGTGGG
351       GAATTTTGGA CAATGGGCGA AAGCCTGATC CAGCCATGCC GCGTGAGTGA
401       AGAAGGCCTT CGGGTTGTAA AGCTCTTTCG GCGGGGAAGA AATCGCATTC
451       TCTAATACAG GATGTGGATG ACGGTACCCG AATAAGAAGC ACCGGCTAAC
501       TACGTGCCAG CAGCCGCGGT AATACGTAGG GTGCGAGCGT TAATCGGAAT
551       TACTGGGCGT AAAGCGTGCG CAGGCGGTTT CGTAAGACAG ACGTGAAATC
601       CCCGGGCTCA ACCTGGGAAC TGCGTTTGTG ACTGCGAGGC TAGAGTTTGG
651       CAGAGGGGGG TGGAATTCCA CGTGTAGCAG TGAAATGCGT AGAGATGTGG
701       AGGAACACCG ATGGCGAAGG CAGCCCCCTG GGCCAATACT GACGCTCATG
751       CACGAAAGCG TGGGGAGCAA ACAGGATTAG ATACCCTGGT AGTCCACGCC
801       CTAAACGATG TCAACTAGGT GTTGGGAGGG TTAAACCTCT TAGTGCCGTA
851       GCTAACGCGT GAAGTTGACC GCCTGGGGAG TACGGCCGCA AGGCTAAAAC
901       TCAAAGGAAT TGACGGGGAC CCGCACAAGC GGTGGATGAT GTGGATTAAT
951       TCGATGCAAC GCGAAAAACC TTACCTACCC TTGACATGTC AGGAATCCCG
1001      GAGAGATTTG GGAGTGCCCG AAAGGGAGCC TGAACACAGG TGCTGCATGG
1051      CTGTCGTCAG CTCGTGTCGT GAGATGTTGG GTTAAGTCCC GCAACGAGCG
1101      CAACCCTTGT CGTTAATTGC CATCATTCAG TTGGGCACTT TAATGAGACT
1151      GCCGGTGACA AACCGGAGGA AGGTGGGGAT GACGTCAAGT CCTCATGGCC
1201      CTTATGGGTA GGGCTTCACA CGTCATACAA TGGTCGGTCC AGAGGGTTGC
1251      CAACCCGCGA GGGGGAGCTA ATCTCAGAAA GCCGATCGTA GTCCGGATTG
1301      CAGTCTGCAA CTCGACTGCA TGAAGTCGGA ATCGCTAGTA ATCGCGGATC
1351      AGCATGTCGC GGTGAATACG TTCCCGGGTC TTGTACACAC CGCCCGTCAC
1401      ACCATGGGAG CGGGTTCTGC CAGAAGTAGT TAGCCTAACC GCAAGGAGGG
1451      CGATTACCAC GGCAGGGTTC GTGACTGGGG TGAAGTCGTA ACAAGGTAAC
1501      C
```
HOD 6 one-primer (519r) sequence

```
  1       GNCGTAGTTA GCCGGTGCTT CTTATTCGGG TACCGTCATC CACATCCTGT
 51       ATTANGAGAA TGCGATTTCT TCCCCGCCGA AAGAGCTTTA CAACCCGAAG
101       GCCTTCTTCA CTCACGCGGC ATGGCTGGAT CAGGCTTTCG CCCATTGTCC
151       AAAATTCCCC ACTGCTGCCT CCCGTAGGAG TCTGGGCCGT GTCTCAGTCC
201       CAGTGTGGCG GATCATCCTC TCAGACCCGN TACGGATCGT CGCCTTGGTG
251       AGCCTTTACC CCACCAACTA GCTAATCCGA CATCGGCGC TCCTAAAGCG
301       CAAGGTCTTG CGATCCCCTG CTTTCCTGCT CACAGAATAT GCGGTATTA
351       AGCGCAACTT TCGCTGCGTT ATCCCCCACT TCAGGGCACG TTCCGATGCA
401       TTACTCACCC GTTCGCCACT CGCCACCAGG AGCAAGCTCC CGTGCTGCCG
```

TABLE 4-continued

Raw data from 16S ribosomal RNA gene sequencing
A = Adenine, T = Thymine, C = Cytosine, G = Guanine,
N = unknown; see Methods section from Wahlquist (2000)
for explanation of sequencing method

```
 451    TTCGACTTGC ATGTGTAAGG CATGCCGCCA GCGTTCAATC TGAGCCAGGA
 501    TCAAACTCTG TTGTCACGAA AC
HOD 7 full (six-primer) sequence 1    AGAGTTTGAT CCTGGCTCAG AACGAACGCT GGCGGCAGGC TTAACACATG
  51    CAAGTCGAGC GCCCCGCAAG GGGAGCGGCA GACGGGTGAG TAACGCGTGG
 101    GAATCTACCC TTTTCTACGG AATAACGCAG GGAAACTTGT GCTAATACCG
 151    TATACGCCCT TCGGGGGAAA GATTTATCGG GAAAGGATGA GCCCGCGTTG
 201    GATTAGCTAG TTGGTGGGGT AAAGGCCTAC CAAGGCGACG ATCCATAGCT
 251    GGTCTGAGAG GATGATCAGC CACATTGGGA CTGAGACACG GCCCAAACTC
 301    CTACGGGAGG CAGCAGTGGG GAATATTGGA CAATGGGCGC AAGCCTGATC
 351    CAGCCATGCC GCGTGAGTGA TGAAGGCCCT AGGGTTGTAA AGCTCTTTCA
 401    CCGGTGAAGA TAATGACGGT AACCGGAGAA GAAGCCCCGG CTAACTTCGT
 451    GCCAGCAGCC GCGGTAATAC GAAGGGGGCT AGCGTTGTTC GGAATTCTGG
 501    GCGTAAAGCG CACGTAGGCG GACATTTAAG TCAGGGGTGA AATCCCGGGG
 551    CTCAACCCCG GAACTGCCTT TGATACTGGG TGTCTAGAGT ATGGAAGAGG
 601    TGAGTGGAAT TCCGAGTGTA GAGGTGAAAT TCGTAGATAT TCGGAGGAAC
 651    ACCAGTGGCG AAGGCGGCTC ACTGGTCCAT TACTGACGCT GAGGTGCGAA
 701    AGCGTGGGGA GCAAACAGGA TTAGATACCC TGGTAGTCCA CGCCGTAAAC
 751    GATGAATGTT AGCCGTCGGG CAGTTTACTG TTCGGTGGCG CAGCTAACGC
 801    ATTAAACATT CCGCCTGGGG AGTACGGTCG CAAGATTAAA ACTCAAAGGA
 851    ATTGACGGGG GCCCGCACAA GCGGTGGAGC ATGTGGTTTA ATTCGAAGCA
 901    ACGCGCAGAA CCTTACCAGC CCTTGACATC CCGATCGCGG ATTACGGAGA
 951    CGTTTTCCTT CAGTTCGGCT GGATCGGAGA CAGGTGCTGC ATGGCTGTCG
1001    TCAGCTCGTG TCGTGAGATG TTGGGTTAAG TCCCGCAACG AGCGCAACCC
1051    TCGCCCTTAG TTGCCAGCAT TTAGTTGGGC ACTCTAAGGG GACTGCCGGT
1101    GATAAGCCGA GAGGAAGGTG GGGATGACGT CAAGTCCTCA TGGCCCTTAC
1151    GGGCTGGGCT ACACACGTGC TACAATGGTG GTGACAGTGG GCAGCGAGAC
1201    CGCGAGGTCG AGCTAATCTC CAAAAGCCAT CTCAGTTCGG ATTGCACTCT
1251    GCAACTCGAG TGCATGAAGT TGGAATCGCT AGTAATCGCA GATCAGCATG
1301    CTGCGGTGAA TACGTTCCCG GGCCTTGTAC ACACCGCCCG TCACACCATG
1351    GGAGTTGGTT CTACCCGAAG GTAGTGCGCT AACCGCAAGG AGGCAGCTAA
1401    CCACGGTAGG GTCAAGCGAC TGGGGTGAAC TCGTAACAAG GTAACC
HOD 8 one-primer (519r) sequence 1    GTCGTAGTTG CCGGTGCTTC TTATTCGGGT ACCGTCATCC ACATCCTGTA
  51    TTANGAGAAT GCGATTTCTT CCCCGCCGAA AGAGCTTTAC AACCCGAAGG
 101    CCTTCTTCAC TCACGCGGCA TGGCTGGATC AGGCTTTCGC CCATTGTCCA
 151    AAATTCCCCA CTGCTGCCTC CCGTAGGAGT CTGGGCCGTG TCTCAGTCCC
 201    AGTGTGGCGG ATCATCCTCT CAGACCCGCT ACNGGATCGT CGCCTTGGTG
 251    AGCCTTTACC CCACCAACTA GCTAATCCGA CATCGGCCGC TCCTAAAGCG
 301    CAAGGTCTTG CGATCCCCTG CTTTCCTGCT CACAGAATAT GCGGTATTAG
 351    CGCAACTTTC GCTTGCGTTA TCCCCCACTT CAGGGCACGT TCCGATGCAT
 401    TACTCACCCG TTCGCCACTC GCCACCAGGA CCAAGCTCCC GTGCTGCCGT
 451    TCGACTTGCA TGTGTAAGGC ATGCCGCAGC GTTCAATCTG AGCCANGATC
 501    AAACTCTGTT GTCAC
HOD 9 one-primer (519r) sequence 1    GNCGTAGTTA GCCGGTGCTT CTTATTCGGG TACCGTCATC CACATCCTGT
  51    ATTANGAGAA TGCGATTTCT TCCCCGCCGA AAGAGCTTTA CAACCCGAAG
 101    GCCTTCTTCA CTCACGCGGC ATGGCTGGAT CAGGCTTTCG CCCATTGTCC
 151    AAAATTCCCC ACTGCTGCCT CCCGTAGGAG TCTGGGCCGT GTCTCAGTCC
 201    CAGTGTCGCG GATCATCCTC TCAGACCCGC TACNGGATCG TCGCCTTGGT
 251    GAGCCTTTAC CCCACCAACT AGCTAATCCG ACATCGGCCG CTCCTAAAGC
 301    GCAAGGTCTT GCGATCCCCT GCTTTCCTGC TCACAGAATA TGCGGTATTA
 351    GCGCAACTTT CGCTGCGTTA TCCCCCACTT CAGGGCACGT TCCGATGCAT
 401    TACTCACCCG TTCGCCACTC GCCACCAGGA GCAAGCTCCC GTGCTGCCGT
 451    TCGACTTGCA TGTGTAAGGC ATGCCGCCAG CGTTCAATCT GAGCCANGAT
 501    CAAACTCTGT TGTCACNAAA AC
```

Heterotophic denitrifiers have been isolated from nearly every environment and are extraordinarily diverse, including thermophiles, diazotrophs, psychrophiles, halophiles, budding bacteria, gliding bacteria, pathogens, phototrophs, fermentative bacteria, magnetotactic bacteria, and others. They are distributed among the division of the domains Archaea and Bacteria. In the Bacteria they include Gram-positive organisms (e.g., actinomycetes, mycobacteria, Bacillus) and Gram-negative organisms (e.g., agrobacteria, pseudomonads, Neisseria, Cytophaga, Aquifex, Campylobacter).

The four identified autohydrogenotrophic denitrifying bacteria reported in the literature belong to the Proteobacteria division of the domain Bacteria. The Proteobacteria consist of the Gram-negative purple photosynthetic bacteria and their nonphotosynthetic relatives. The division is exceptionally diverse and is divided into five subdivisions: the alpha subdivision (e.g., purple nonsulfur bacteria, rhizobacteria, agrobacteria, Nitrobacter), the beta subdivision (e.g., Alcaligenes, Rhodocyclus, Bordatella, Neisseria, Thiobacillus), the gamma subdivision (e.g., purple sulfur bacteria, Azobacter, Chromatium, Enterobacteriaceae, the pseudomonads, Vibrio), the delta subdivision (e.g., mycobacteria, Bdellovibrio, Desulfovibrio) and the epsilon subdivision (e.g., Campylobacter, Wolinella).

Based on this information, it does not appear that the autohydrogenotrophic denitrifying bacteria would form a monophyletic group. However, one skilled in the art can, without undue experimentation, readily determine if a microorganism is an HOD bacterium by testing it as described above. That is, by growing an isolate on HOD medium as described above in the presence of hydrogen, development of turbidity accompanied by loss of nitrate is considered to be a positive result of HOD capacity.

Component 2. Hydrogen Generator

The use of hydrogen-enhanced denitrification to remove nitrate from a water supply ultimately depends upon the availability of a low-cost, continual source of hydrogen gas. While electrolytic hydrogen generators are currently rather expensive, other means can be used to produce hydrogen for denitrification of water by this method. Other techniques for generating hydrogen gas include corrosive oxidation of Fe(0) or basalt that produces cathodic hydrogen gas from water, biological fermentation or electrolysis units that can operate with a low voltage power supply.

In one embodiment of this invention, hydrogen gas is produced by hydrolysis of water in a dual-chamber, glass reservoir (2). The two chambers are each sealed with a pressure-tight screw top cap that is penetrated with a platinum wire electrode (3). The chambers are connected via hollow glass tubing and contain 4 N sodium hydroxide. The rate of hydrogen gas evolution in the hydrogen generator is dependent upon the concentration of sodium hydroxide used in the hydrogen generator. Therefore, the sodium hydroxide concentration can be adjusted to match the amount of hydrogen required for a specific bioreactor application. Potassium hydroxide can be used as a substitute for the sodium hydroxide.

A 12 volt 2 amp DC electrical potential is continuously applied to the electrodes using a commercial automobile battery charger (1). Oxygen gas is produced in the cathode chamber and is channeled via metal tubing through a sodium hydroxide trap (5) to an adjustable gas flow controller (6). Hydrogen gas is produced in the anode chamber and is channeled through a sodium hydroxide trap (5), a check valve (7) to prevent back flow, and into the bioreactor (8–10). Internal pressure within the chambers of the hydrogen generator is balanced using the adjustable flow controller.

Component 3 Flow-through Bioreactor

The flow-through bioreactor (8–10) is constructed from plastic pipe and fitted with sealed endcaps. The bioreactor is filled with a coarse porous medium (9) such as washed pea gravel (2–4 mm in diameter) or plastic or glass beads, which serve as solid surfaces to support biofilm formation by the HOD bacteria. Nitrate-laden water is pumped into the top of the reactor and travels downward through the porous medium where it contacts the microbial biofilm, and exits out the bottom of the bioreactor nitrate-free. The water level within the bioreactor is controlled by the height of the exit tube.

Hydrogen gas enters the bioreactor via an airstone (10) in the bottom. Hydrogen bubbles travel upward, countercurrent to water flow, and are vented out the top endcap. In addition to serving as a substrate for the HOD bacteria, the hydrogen bubbles strip oxygen from the influent water and nitrogen gas from water within the reactor that is produced via the denitrification reaction. The headspace volume in the bioreactor is designed not to exceed 1–5% of the total volume of the bioreactor to minimize the amount of hydrogen gas present within the system.

Component 4. Sand Filtration Unit.

The nitrate-free water exiting the bioreactor then percolates via gravity flow through a sand filtration unit (11–13). This unit is constructed with pipe, generally made of plastic, fitted with a bottom endcap. The unit is filled with a bottom layer of coarse porous medium such as pea gravel 4–6 inches thick, and overlain with clean, coarse to-medium grained sand (12). On top of the sand column is a block (13) to evenly distribute the input water over the surface of the sand. The overall height of the sand filter unit is approximately equivalent to the height of the water column within the bioreactor. In the sand filter, the water is aerated and filtered to remove suspended microorganisms from the bioreactor effluent. The top layer of sand within the infiltration unit is periodically removed and replaced with clean sand. Water exits the sand filter unit via a tube inserted in the bottom endcap.

Preferred and Extreme Ranges of Conditions

For water with a nitrate concentration of about 2 mM (28 mg/L nitrogen), the optimum hydraulic residence time in the bioreactor is about 1.5–2 hours at a temperature of 25° C. The bioreactor can effectively remove nitrate concentrations of about 0.7 to 20 mM (10–280 mg/L nitrogen) in a pH range of about 6–9.

A bioreactor as described above was grown initially with HOD medium and then switched to well water input. The water used had a total dissolved solids load of 204 mg/l, an alkalinity of 190 mg/l as $CaCO_3$, and a pH of 8. This was selected to test the bioreactor using a water source that would represent a challenge for the HOD bacteria, given the composition and pH of the well water. The well water was used "as is", except that nitrate was added. No effort was made to provide nutrients required for HOD growth, such as trace minerals, phosphorus, or inorganic carbon, or to remove indigenous ground-water bacteria. In general, the mixed-culture bioreactor was able to remove nitrate from the well-water input; nitrate levels in the output were well below the drinking water limit, as shown in FIG. 4. There were several instances when the output nitrate concentrations were high, but these were all due to an inadvertent shutdown of the hydrogen generator. It was discovered that routine replacement of the water consumed by hydrolysis within the hydrogen generator was important. After 100 days of operation, the nitrate concentration in the input was significantly increased, without any appreciable effect upon the function of the bioreactor (FIG. 4).

The device of the present invention provides for small-scale treatment of nitrate-contaminated water. The process and apparatus of the present invention provide for the complete removal and destruction of nitrate from a water supply. The apparatus is small scale and cost effective. The device has its own hydrogen generator, and uses specially chosen autotrophic, hydrogen-oxidizing-denitrifying bacteria that have been isolated from ground water environments. The water filtration unit is low cost and low maintenance.

The apparatus of the present invention comprises four principle components: (1) autotrophic, hydrogen-oxidizing denitrifying bacteria isolated from subsurface environments; (2) a low-cost water electrolysis unit that provides a continual supply of oxygen-free hydrogen; (3) a flow-through bioreactor that contains the HOD bacteria and is designed to maximize their ability to remove nitrate in the presence of hydrogen; and (4) a filtration unit to remove unwanted microbial biomass from the treated water. The present invention provides an important new combination of components to treat nitrate-contaminated water on a small scale basis. Of particular importance is the use of purple, non-sulfur phototrophic bacteria to treat nitrate contamination in combination with hydrogen.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

References

Aragno, M., & Schlegel, H. G., 1981. The hydrogen-oxidizing bacteria, p.865–893. In: Starr, M. P., Stolp, Truper, H. G., Balows, A., & Schlegel, H. G. (Eds.), The Prokaryotes: A Handbook on Habitats, Isolation, and Identification of Bacteria, pp. 865–893, Springer-Verlag, New York.

Brooks, M. H., Smith, R. L. & Macalady, D. L., 1992. Inhibition of existing denitrification enzyme activity by chloramphenicol. Appl. Environ. Microbiol. 58:1746–1753.

Gros, H., Schnoor, G., & Rutten, P., 1988. Biological denitrification process with hydrogen-oxidizing bacteria for drinking water treatment. Water Supply 6:193–198.

Lettings et al., Biotechnol. Bioing. 22:695–734 (1980)

Liessens, J., Vanbrabant, J., Devos, P., Kersters, K., & Verstraete, W., 1992. Mixed culture hydrogenotrophic nitrate reduction in drinking water. Microb. Ecol. 24:271–290.

Spaulding, R. F., & Parrott, J. D., 1994. Shallow groundwater denitrification. Sci. Tot. Environ. 141:17–25.

Smith, R. L., Caezan, M. L., & Brooks, M. H., 1994. Autotrophic, hydrogenoxidizing denitrifying bacteria in ground water, potential agents for bioremediation of nitrate contamination. Appl. Environ. Microbiol. 60:1949–1955.

Smith, R. L., & Duff, J. H. 1988. Denitrification in contaminated groundwater. Appl. Environ. Microbiol. 54:1071–1078.

Smith, R. L., Howes, B. L., & Duff, J. H., 1991. Denitrification in nitrate-contaminated groundwater: Occurence in step vertical geochemical gradients. Geochim. Cosmochim. Acta 55:1815–1825.

Smith, R. L., Garabedian, S. P., & Brooks, M. H., 1996. Comparison of denitrification activity measurements in ground water using cores and natural gradient tracer tests. Environ. Sci. Technol. 30:3448–3456.

Timmermans, "Kinetics and Guidelines for the Design of Biological Denitrification Systems of Water," 1983 Doctoral thesis, Catholic University of Louvain Belgium.

Wahlquist, A. M., 2000, The abundance and diversity of autohydrogenotrophic denitrifying bacteria in four aquifers. Masters Thesis, University of Colorado, 73pp.

What is claimed is:

1. A method for removing nitrate from nitrate-contaminated water comprising treating said water in a hydrogen-fed bioreactor with autotrophic, hydrogen-oxidizing denitrifying bacteria.

2. The method according to claim 1 wherein the bacteria are purple, non-sulfur phototrophic bacteria.

3. The method according to claim 1 comprising generating hydrogen gas by a method selected from the group consisting of corrosive oxidation of iron, biological fermentation, or electrolysis.

4. The method according to claim 3 wherein the hydrogen is produced by electrolysis of water.

5. The method according to claim 1 wherein the bacteria have been isolated from nitrate-containing groundwater.

6. The method according to claim 1 wherein the bacteria use nitrate as a respiratory terminal electron acceptor whereby nitrate is converted to nitrogen gas.

7. The method according to claim 1 wherein the bacteria belong to the Proteobacteria of the domain Bacteria.

8. The method according to claim 1 wherein the bacteria are supported on a solid surface to support biofilm formation by the bacteria.

9. The method according to claim 8 wherein after the water has been treated by the bacteria on a solid support, the water is percolated through a sand filtration unit.

10. The method according to claim 1 wherein the nitrate-contaminated water is drinking water.

11. The method according to claim 1 wherein the bacteria do not require nitrate to function.

* * * * *